(12) United States Patent
Ikeda et al.

(10) Patent No.: US 11,216,970 B2
(45) Date of Patent: Jan. 4, 2022

(54) IMAGE PROCESSING APPARATUS CAPABLE OF PRESENTING AN IMAGE DEFECT THAT CAN APPEAR ON AN IMAGE BEFORE THE IMAGE IS ACTUALLY PRINTED, PRINT SYSTEM, AND NON-TRANSITORY COMPUTER READABLE MEDIUM

(71) Applicant: FUJIFILM Business Innovation Corp., Tokyo (JP)

(72) Inventors: Kentaro Ikeda, Kanagawa (JP); Kodai Suzuki, Kanagawa (JP); Hisao Komazawa, Kanagawa (JP); Satoshi Misawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 77 days.

(21) Appl. No.: 16/535,081

(22) Filed: Aug. 8, 2019

(65) Prior Publication Data
US 2020/0311958 A1    Oct. 1, 2020

(30) Foreign Application Priority Data

Mar. 25, 2019  (JP) .............................. JP2019-056637

(51) Int. Cl.
*G06T 7/70*     (2017.01)
*H04N 1/00*     (2006.01)
*G06T 7/00*     (2017.01)
*B41J 2/21*     (2006.01)

(52) U.S. Cl.
CPC .............. *G06T 7/70* (2017.01); *B41J 2/2132* (2013.01); *G06T 7/0004* (2013.01); *H04N 1/00005* (2013.01); *G06T 2207/30144* (2013.01)

(58) Field of Classification Search
None
See application file for complete search history.

(56) References Cited

U.S. PATENT DOCUMENTS

| 7,124,041 | B1 * | 10/2006 | Johnson | G05B 9/02 702/58 |
| 2007/0024664 | A1 * | 2/2007 | Shang | B41J 29/393 347/19 |
| 2008/0013848 | A1 * | 1/2008 | Wu | H04N 1/00087 382/254 |
| 2008/0126860 | A1 * | 5/2008 | Sampath | H04N 1/00413 714/25 |
| 2009/0138765 | A1 * | 5/2009 | German | G06K 15/102 714/57 |
| 2015/0373305 | A1 * | 12/2015 | Hauf | B41J 2/195 427/8 |

FOREIGN PATENT DOCUMENTS

| JP | 2004046561 | 2/2004 |
| JP | 2017213773 | 12/2017 |

* cited by examiner

*Primary Examiner* — Tahmina N Ansari
(74) *Attorney, Agent, or Firm* — JCIPRNET

(57) ABSTRACT

An image processing apparatus includes a creation unit creating output image data to be used in an image forming unit forming an output image on a recording material by using original image data input from an outside, an acquisition unit acquiring defect position data related to a position of a defect on the recording material which is attributable to the image forming unit, and an output unit outputting display image data to be used for display on a screen of a display unit by using the output image data and the defect position data.

12 Claims, 11 Drawing Sheets

FIG. 6

PRINTING MANAGEMENT TABLE

| NAME | PAPER/PRINTING SETTING ||||||||||||||
| | PAPER SETTING |||||| PRINTING SETTING |||||||| LAST UPDATE DATE |
| | SIZE (mm) | BASIS WEIGHT (g/m²) | TYPE | PRE-PRINT | COAT | PUNCH HOLE | TRANSPORT SETTING || DISCHARGE SETTING |||| DRYING SETTING || COOLING SETTING | |
| | | | | | | | FIRST SPEED V1 (m/s) | SECOND SPEED V2 (m/s) | NON-DISCHARGE NOZZLE | GRADATION CORRECTION COEFFICIENT | NON-UNIFORMITY CORRECTION COEFFICIENT | DISCHARGE TIMING CORRECTION COEFFICIENT | DRYING DRUM | HOT AIR BLOWER | COOLING ROLL | |
| X-1 | 400 | 100 | PLAIN PAPER | NONE | NONE | NONE | 80 | 40 | ... | ... | ... | ... | ... | ... | ... | MARCH 1 |
| X-2 | 400 | 100 | PLAIN PAPER | NONE | NONE | NONE | 60 | 20 | ... | ... | ... | ... | ... | ... | ... | MARCH 4 |
| Y-1 | 300 | 80 | RECYCLED PAPER | NONE | PRESENT | 2 HOLE | 60 | 30 | ... | ... | ... | ... | ... | ... | ... | FEBRUARY 26 |
| Z-1 | 300 | 120 | TACK PAPER | PRESENT | PRESENT | NONE | 50 | 30 | ... | ... | ... | ... | ... | ... | ... | MARCH 2 |
| ... | ... | ... | ... | ... | ... | ... | ... | ... | ... | ... | ... | ... | ... | ... | ... | ... |

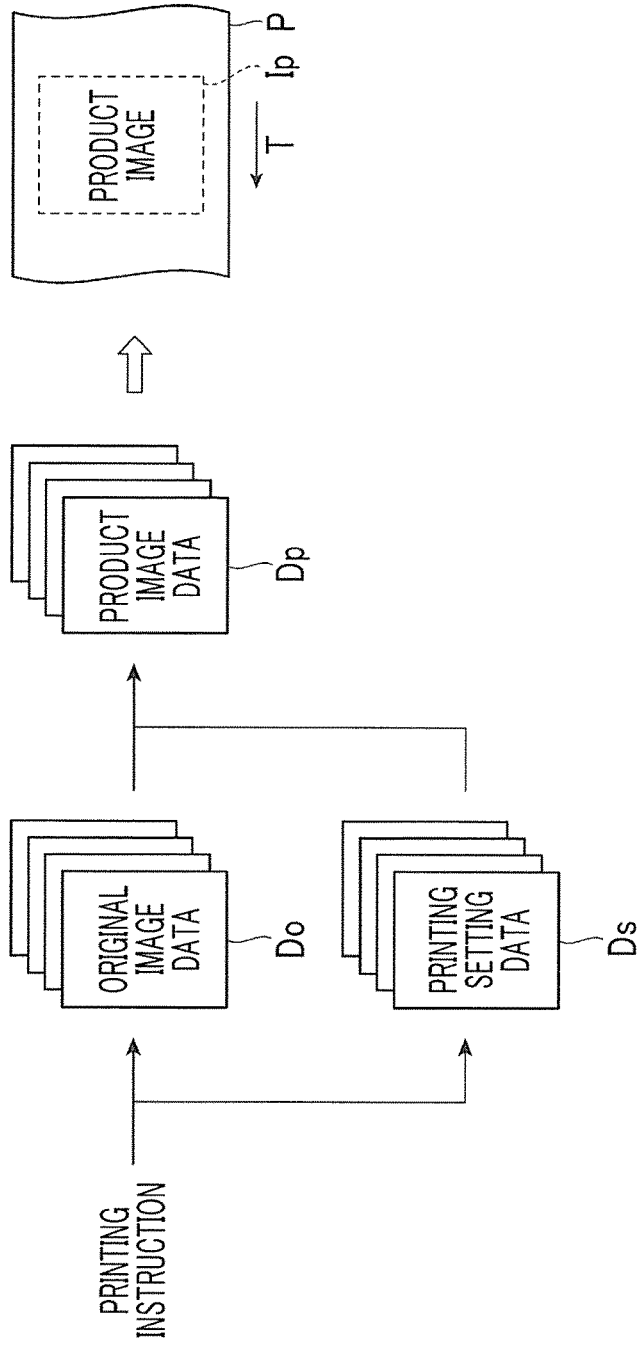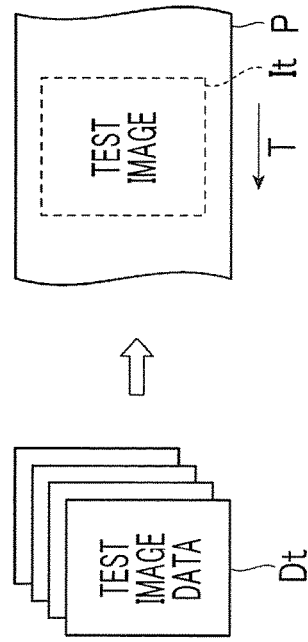

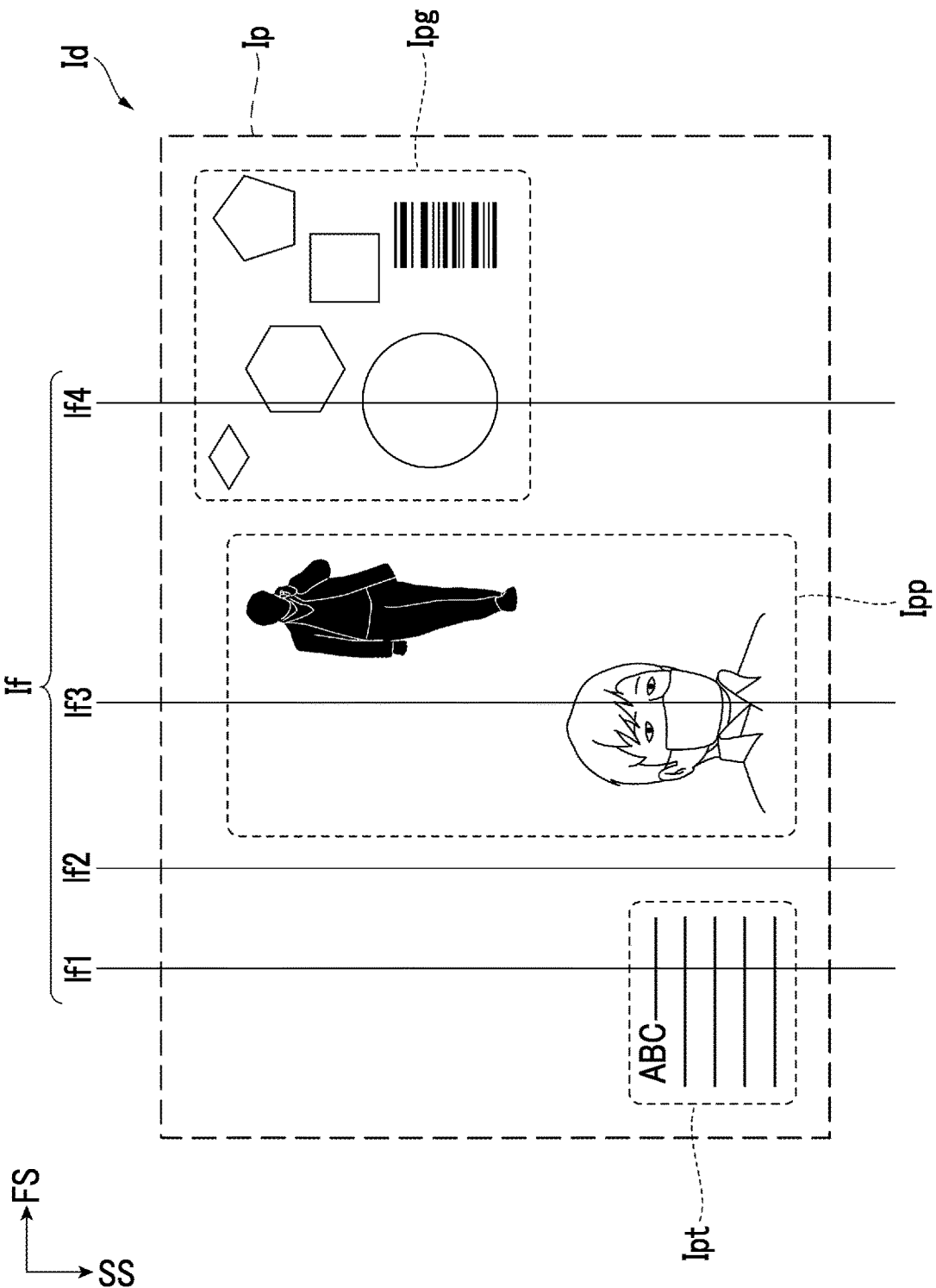

IMAGE PROCESSING APPARATUS CAPABLE OF PRESENTING AN IMAGE DEFECT THAT CAN APPEAR ON AN IMAGE BEFORE THE IMAGE IS ACTUALLY PRINTED, PRINT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-056637 filed Mar. 25, 2019.

BACKGROUND

(i) Technical Field

The present invention relates to an image processing apparatus, a print system, and a non-transitory computer readable medium storing a program.

(ii) Related Art

JP2017-213773A discloses performing (Procedure 1) test chart output, (Procedure 2) image information reading, (Procedure 3) image information analysis, and (Procedure 4) correction processing as defective nozzle correction processing in a digital inkjet printer.

Also described in JP2017-213773A is reducing the visibility of a white streak-shaped non-uniformity generated in a non-discharge nozzle by increasing the drawing density of a nozzle close to the non-discharge nozzle and without forcible discharge from the non-discharge nozzle in a case where the non-discharge nozzle is present.

SUMMARY

In the related art, it is difficult to grasp the positional relationship between an image and an image defect attributable to an image forming portion (such as the non-discharge nozzle) unless the image is actually printed on a recording material.

Aspects of non-limiting embodiments of the present disclosure relate to presenting an image defect that can appear on an image before the image is actually printed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

An image processing apparatus includes a creation unit creating output image data to be used in an image forming unit forming an output image on a recording material by using original image data input from an outside, an acquisition unit acquiring defect position data related to a position of a defect on the recording material which is attributable to the image forming unit, and an output unit outputting display image data to be used for display on a screen of a display unit by using the output image data and the defect position data.

BRIEF DESCRIPTION OF THE DRAWINGS

Exemplary embodiment(s) of the present invention will be described in detail based on the following figures, wherein:

FIG. 6 is a diagram illustrating an outline of a printing management table stored in the printing control device;

FIG. 8($a$) is a diagram illustrating the relationship between various images and various data used in "normal mode" and FIG. 8($b$) is a diagram illustrating the relationship between various images and various data used in "adjustment mode";

FIG. 11 is a diagram illustrating an example of an overlapping image displayed on a display device based on the display image data.

DETAILED DESCRIPTION

Hereinafter, an exemplary embodiment of the present invention will be described in detail with reference to accompanying drawings.

Configuration of Print System

Figure 1:
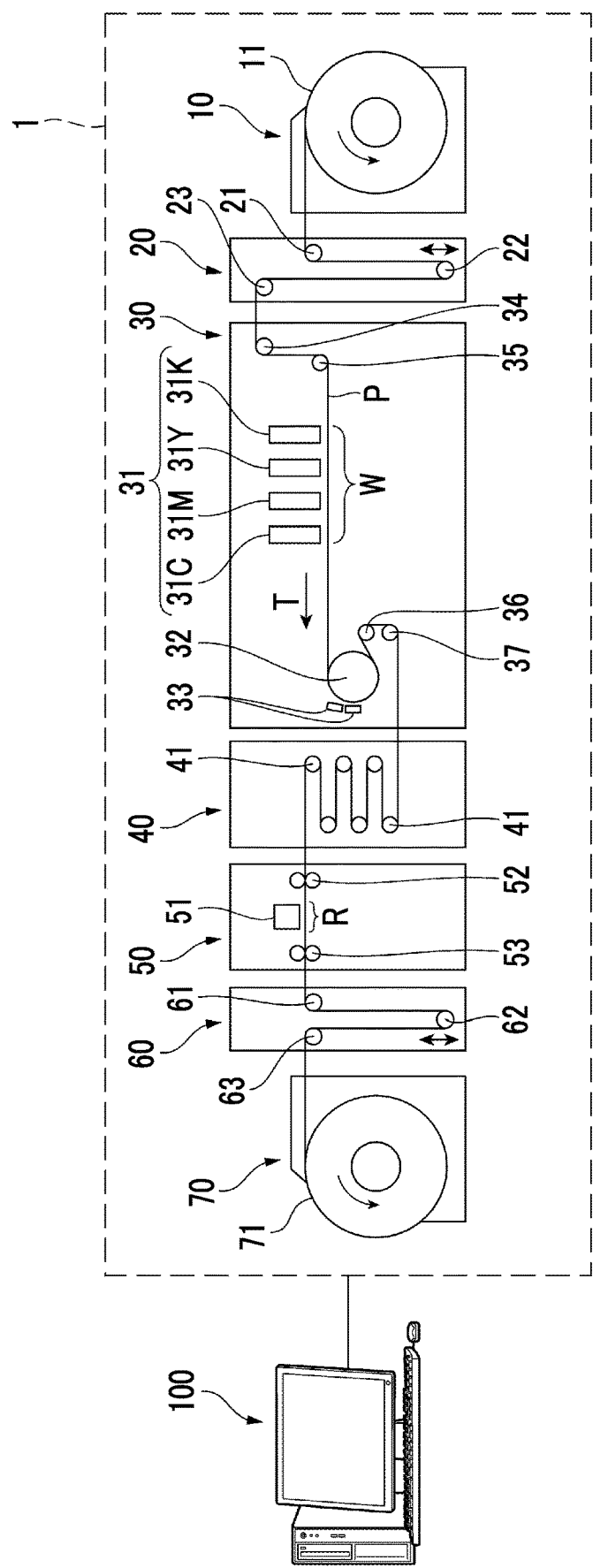
FIG. 1 is a diagram illustrating an overall configuration example of a print system to which an exemplary embodiment of the present invention is applied.

FIG. 1 is a diagram illustrating an overall configuration example of a print system to which the exemplary embodiment of the present invention is applied.

The print system of the present exemplary embodiment is provided with a printing device 1 sequentially printing images by a so-called inkjet method with respect to continuous paper P (an example of a recording material) transported along a transport direction T and a printing control device 100 creating various image data as the sources of the images printed by the printing device 1, outputting the image data to the printing device 1, and controlling the operation of the printing device 1.

The configuration of the printing device 1 and the configuration of the printing control device 100 will be sequentially described below.

Configuration of Printing Device

The printing device 1 illustrated in FIG. 1 will be described first.

The printing device 1 of the present exemplary embodiment is provided with a delivery unit 10 delivering the continuous paper P and an image forming unit 30 performing image printing, that is, image formation on the continuous paper P sent from the delivery unit 10.

In addition, the printing device 1 is provided with a cooling unit 40 cooling the continuous paper P sent from the image forming unit 30, an image reading unit 50 reading an image formed on the continuous paper P sent from the cooling unit 40, and a winding unit 70 winding the continuous paper P sent from the image reading unit 50.

Further, the printing device 1 is provided with an input side buffer unit 20 absorbing the speed difference of transported continuous paper P between the delivery unit 10 and the image forming unit 30 and giving a predetermined tension to the continuous paper P and an output side buffer unit 60 absorbing the speed difference of transported continuous paper P between the image reading unit 50 and the winding unit 70 and giving a predetermined tension to the continuous paper P.

Accordingly, in the printing device 1, the delivery unit 10, the input side buffer unit 20, the image forming unit 30, the cooling unit 40, the image reading unit 50, the output side buffer unit 60, and the winding unit 70 are disposed in this order along the transport direction T of the continuous paper P from the right side to the left side in the drawing.

Configuration of Delivery Unit

The delivery unit 10 is provided with a delivery roll 11 on which the continuous paper P wound in a roll shape is mounted before printing by the image forming unit 30. The delivery roll 11 delivers the pre-printing continuous paper P by rotating in the arrow direction in the drawing.

Configuration of Input Side Buffer Unit

The input side buffer unit 20 has an input side first pass roll 21, an input side dancer roll 22, and an input side second pass roll 23 disposed in this order along the transport direction T of the continuous paper P. Each of the input side first pass roll 21, the input side dancer roll 22, and the input side second pass roll 23 is provided so as to be rotatable.

Of the input side first pass roll 21, the input side dancer roll 22, and the input side second pass roll 23, the input side first pass roll 21 is provided on the most upstream side and the input side second pass roll 23 is provided on the most downstream side. The position of the rotation axis of each of the input side first pass roll 21 and the input side second pass roll 23 is fixed.

The input side dancer roll 22 is provided between the input side first pass roll 21 and the input side second pass roll 23, that is, on the midstream side. The input side dancer roll 22 is provided such that the position of the rotation axis of the input side dancer roll 22 is movable in the up-down direction indicated by an arrow in the drawing.

Configuration of Image Forming Unit

The image forming unit 30 is provided with a discharge head group 31 (an example of an image forming unit) performing image formation by discharging and affixing colored ink to the transported continuous paper P.

In addition, the image forming unit 30 is provided with a drying drum 32 disposed downstream of the discharge head group 31 in the transport direction T of the continuous paper P. The drying drum 32 dries the continuous paper P by performing heating while being in contact in a state where the ink-affixed continuous paper P is wound.

Further, the image forming unit 30 is provided with a hot air blower 33 disposed at a part facing the continuous paper P wound around the drying drum 32. The hot air blower 33 blows hot air to the continuous paper P in a state where the hot air blower 33 is not in contact with the ink-affixed continuous paper P.

Furthermore, the image forming unit 30 is provided with a first transport roll 34 and a second transport roll 35 disposed upstream of the discharge head group 31 in the transport direction T of the continuous paper P. The first transport roll 34 and the second transport roll 35 are disposed in this order along the transport direction T. Each of the first transport roll 34 and the second transport roll 35 is provided so as to be rotatable.

The image forming unit 30 is provided with a third transport roll 36 and a fourth transport roll 37 disposed downstream of the drying drum 32 in the transport direction T of the continuous paper P. The third transport roll 36 and the fourth transport roll 37 are disposed in this order along the transport direction T. Each of the third transport roll 36 and the fourth transport roll 37 is provided so as to be rotatable.

The printing device 1 of the present exemplary embodiment is capable of forming a so-called full color image on the continuous paper P.

For this reason, the discharge head group 31 provided in the image forming unit 30 has a black head 31K forming a black image, a yellow head 31Y forming a yellow image, a magenta head 31M forming a magenta image, and a cyan head 31C forming a cyan image sequentially from the upstream side in the transport direction T of the continuous paper P.

In the following description, the region in the image forming unit 30 where the transported continuous paper P and the discharge head group 31 (black head 31K to cyan head 31C) face each other, that is, the region where the discharge head group 31 performs image writing (printing) with respect to the continuous paper P will be referred to as "image writing region W".

Configuration of Cooling Unit

The cooling unit 40 is provided with a plurality of (six in this example) cooling rolls 41. Each of the cooling rolls 41 is disposed so as to be rotatable. Each of the cooling rolls 41 cools the continuous paper P in contact with the continuous paper P by passing the continuous paper P.

A refrigerant (such as water, not illustrated) is circulated and supplied to the inside of each of the cooling rolls 41.

Configuration of Image Reading Unit

The image reading unit 50 is provided with a linear image sensor 51 imaging the continuous paper P by using a plurality of solid-state imaging devices. The linear image sensor 51 is disposed so as to face the surface of the transported continuous paper P on the side on which an image is formed by the discharge head group 31 of the image forming unit 30 (surface facing the upper side in the drawing).

In the following description, the region in the image reading unit 50 where the transported continuous paper P and the linear image sensor 51 face each other, that is, the region where the linear image sensor 51 performs image reading with respect to the continuous paper P will be referred to as "image reading region R".

In addition, the image reading unit 50 is provided with a pair of upstream side transport rolls 52 rotatably disposed upstream of the image reading region R in the transport direction T of the continuous paper P and a pair of downstream side transport rolls 53 rotatably disposed downstream of the image reading region R in the transport direction T of the continuous paper P.

Configuration of Output Side Buffer Unit

The output side buffer unit 60 has an output side first pass roll 61, an output side dancer roll 62, and an output side second pass roll 63 disposed in this order along the transport direction T of the continuous paper P. Each of the output side first pass roll 61, the output side dancer roll 62, and the output side second pass roll 63 is provided so as to be rotatable.

Of the output side first pass roll 61, the output side dancer roll 62, and the output side second pass roll 63, the output side first pass roll 61 is provided on the most upstream side and the output side second pass roll 63 is provided on the most downstream side. The position of the rotation axis of each of the output side first pass roll 61 and the output side second pass roll 63 is fixed.

The output side dancer roll 62 is provided between the output side first pass roll 61 and the output side second pass roll 63, that is, on the midstream side. The output side dancer roll 62 is provided such that the position of the rotation axis of the output side dancer roll 62 is movable in the up-down direction indicated by an arrow in the drawing.

Configuration of Winding Unit

The winding unit 70 is provided with a winding roll 71 on which the continuous paper P wound in a roll shape is mounted after printing by the image forming unit 30. The winding roll 71 winds the post-printing continuous paper P by rotating in the arrow direction in the drawing.

Configuration of Black Head

Next, the configuration of the discharge head group 31 provided in the image forming unit 30 of the printing device 1 of the present exemplary embodiment will be described.

The black head 31K, the yellow head 31Y, the magenta head 31M, and the cyan head 31C that constitute the discharge head group 31 have the same configuration except for the color of the ink that is used, and thus the black head 31K will be described as an example here.

Figure 2:
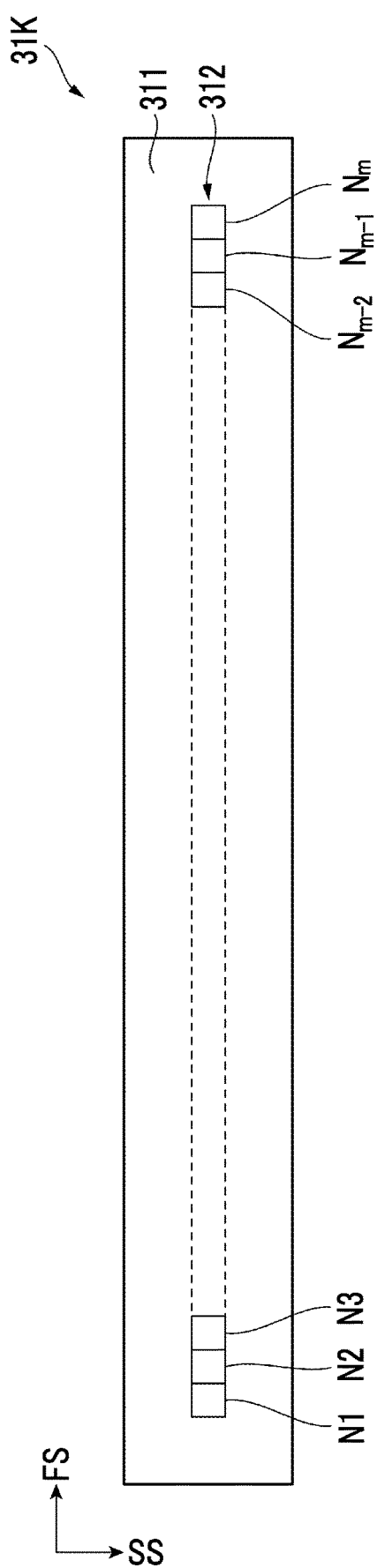
FIG. 2 is a diagram illustrating a schematic configuration of a black head provided in an image forming unit.

FIG. 2 is a diagram illustrating a schematic configuration of the black head 31K provided in the image forming unit 30.

Here, FIG. 2 is a front view of the black head 31K as viewed from the image writing region W (see FIG. 1) side facing the continuous paper P.

In the following description, the direction along the surface of the continuous paper P and intersecting with the transport direction T of the continuous paper P in the printing device 1 illustrated in FIG. 1 will be referred to as "main scanning direction FS" and the direction along the transport direction T will be referred to as "sub scanning direction SS".

The black head 31K of the present exemplary embodiment is provided with a rectangular head plate 311 extending along the main scanning direction FS and a nozzle row 312 in which a plurality of (m in this example) nozzles N1 to Nm are arranged in a row along the main scanning direction FS with respect to the head plate 311.

Here, with regard to the ink discharge method of the nozzles N1 to Nm constituting the nozzle row 312, various methods such as a piezo method and a thermal method may be adopted insofar as the ink discharge can be switched ON/OFF.

As for the nozzles N1 to Nm, the interval between adjacent nozzles (such as N1 and N2) is determined such that the resolution in the main scanning direction FS in the image forming operation (main scanning direction writing resolution) is, for example, 1,200 dots per inch (dpi).

Although the nozzle row 312 is configured by them nozzles N1 to Nm being arranged in a row along the main scanning direction FS in the example illustrated in FIG. 2, the present invention is not limited thereto.

For example, a plurality of nozzle group mounting chips in which a plurality of nozzles are arranged along the main scanning direction FS may be prepared and the plurality of nozzle group mounting chips may be arranged in a zigzag form in the main scanning direction FS and the sub scanning direction SS with respect to the head plate 311.

Configuration of Linear Image Sensor

Next, the configuration of the linear image sensor 51 provided in the image reading unit 50 of the printing device 1 of the present exemplary embodiment will be described.

Figure 3:
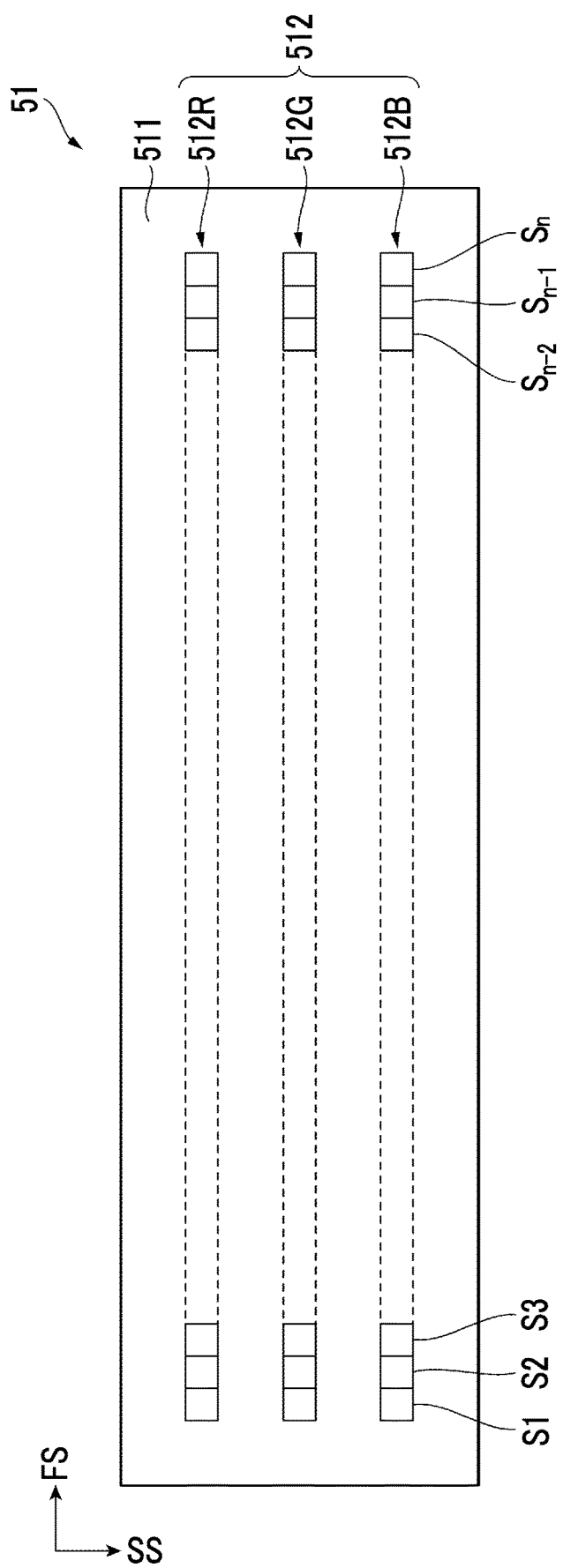
FIG. 3 is a diagram illustrating a schematic configuration of a linear image sensor provided in an image reading unit.

FIG. 3 is a diagram illustrating a schematic configuration of the linear image sensor 51 provided in the image reading unit 50.

Here, FIG. 3 is a front view of the linear image sensor 51 as viewed from the image reading region R (see FIG. 1) side facing the continuous paper P.

The linear image sensor 51 of the present exemplary embodiment is provided with a rectangular sensor plate 511 extending along the main scanning direction FS and a sensor row group 512. Three sensor rows constitute the sensor row group 512. Each of the sensor rows extends along the main scanning direction FS with respect to the sensor plate 511.

In addition, the sensor row group 512 has a red sensor row 512R provided on the most upstream side in the sub scanning direction SS, a green sensor row 512G provided downstream of the red sensor row 512R in the sub scanning direction SS, and a blue sensor row 512B provided downstream of the green sensor row 512G (on the most downstream side) in the sub scanning direction SS.

Here, each of the red sensor row 512R, the green sensor row 512G, and the blue sensor row 512B is configured by a plurality of (n in this example) sensors S1 to Sn being arranged in a row along the main scanning direction FS.

A filter selectively transmitting red light is attached to each of the sensors S1 to Sn constituting the red sensor row 512R, a filter selectively transmitting green light is attached to each of the sensors S1 to Sn constituting the green sensor row 512G, and a filter selectively transmitting blue light is attached to each of the sensors S1 to Sn constituting the blue sensor row 512B.

As for the sensors S1 to Sn provided in each of the red sensor row 512R, the green sensor row 512G, and the blue sensor row 512B, the interval between adjacent sensors (such as sensors S1 and S2) is determined such that the resolution in the main scanning direction FS in the image reading operation (main scanning direction reading resolution) is, for example, 1,200 dpi as in the case of the main scanning direction writing resolution.

In the actual image reading unit 50 (see FIG. 1), a light source (not illustrated) irradiating the continuous paper P passing through an image reading position R with light (such as white light) is attached adjacent to the linear image sensor 51 and along the main scanning direction FS.

Configuration of Printing Control Device

Next, the printing control device 100 illustrated in FIG. 1 will be described.

A computer device such as a so-called personal computer constitutes the printing control device 100 as an example of an image processing apparatus.

Hardware Configuration of Printing Control Device

Figure 4:
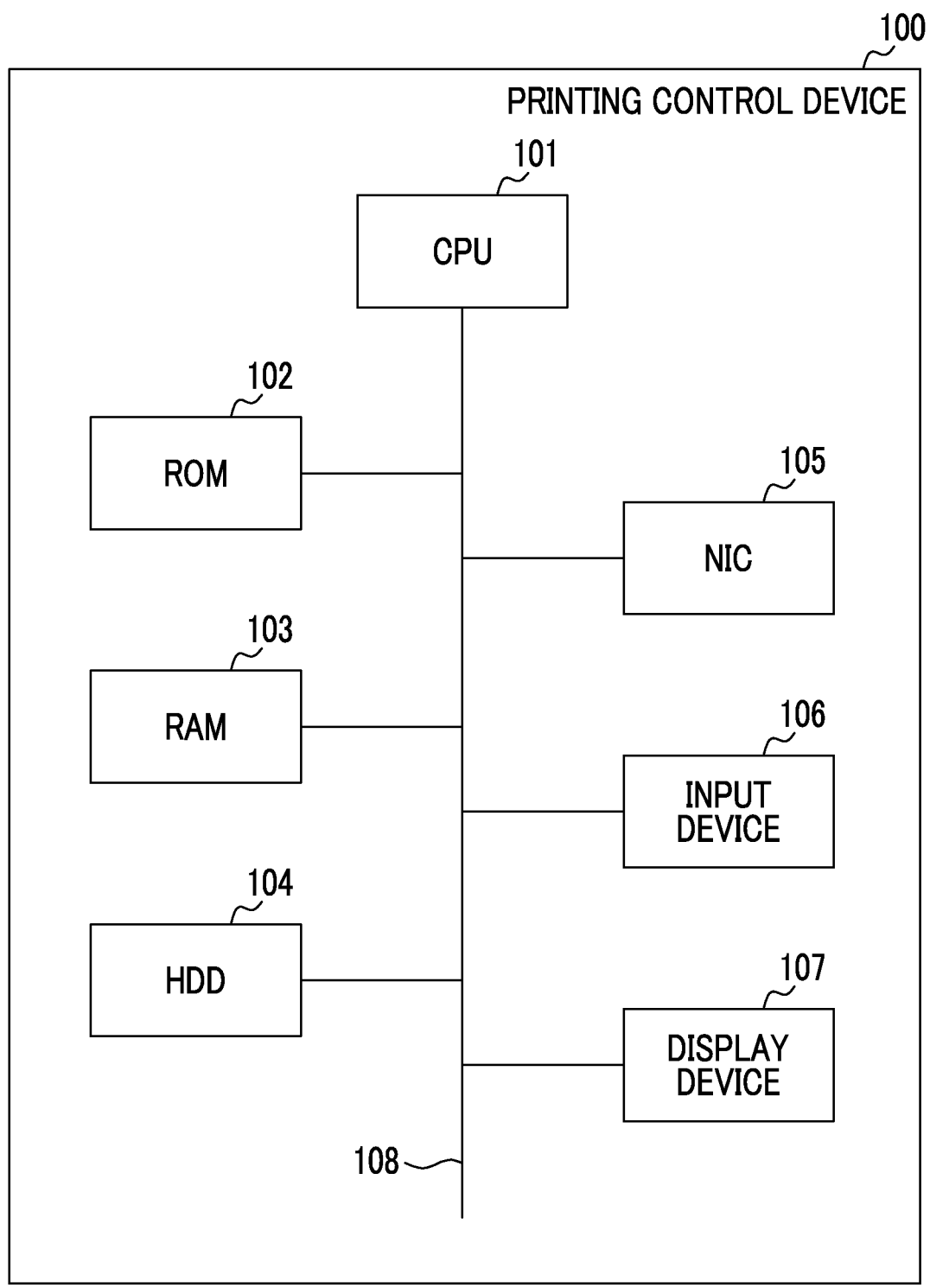
FIG. 4 is a diagram illustrating a hardware configuration of a printing control device.

FIG. 4 is a diagram illustrating a hardware configuration of the printing control device 100.

The printing control device 100 of the present exemplary embodiment is provided with a central processing unit (CPU) 101 reading and executing a program such as an OS and various applications, a read only memory (ROM) 102 storing the program executed by the CPU 101, data used when the program is executed, and the like, and a random access memory (RAM) 103 storing, for example, data temporarily generated when the program is executed.

In addition, the printing control device 100 is provided with a hard disk drive (HDD) 104 storing various programs, various data, and the like, a network interface card (NIC) 105 performing data transmission and reception to and from a device such as the printing device 1 provided outside the printing control device 100, an input device 106 receiving an input from an operator, a display device 107 displaying an image on a display screen, and a bus 108 connecting the HDD 104, the NIC 105, the input device 106, and the display device 107.

The program executed by the CPU 101 provided in the printing control device 100 can be pre-stored in the ROM 102 or the HDD 104. In addition, the program executed by the CPU 101 provided in the printing control device 100 can be stored in a storage medium such as a CD-ROM and provided to the CPU 101 or can be provided to the CPU 101 via a network (not illustrated).

Functional Configuration of Printing Control Device

Figure 5:
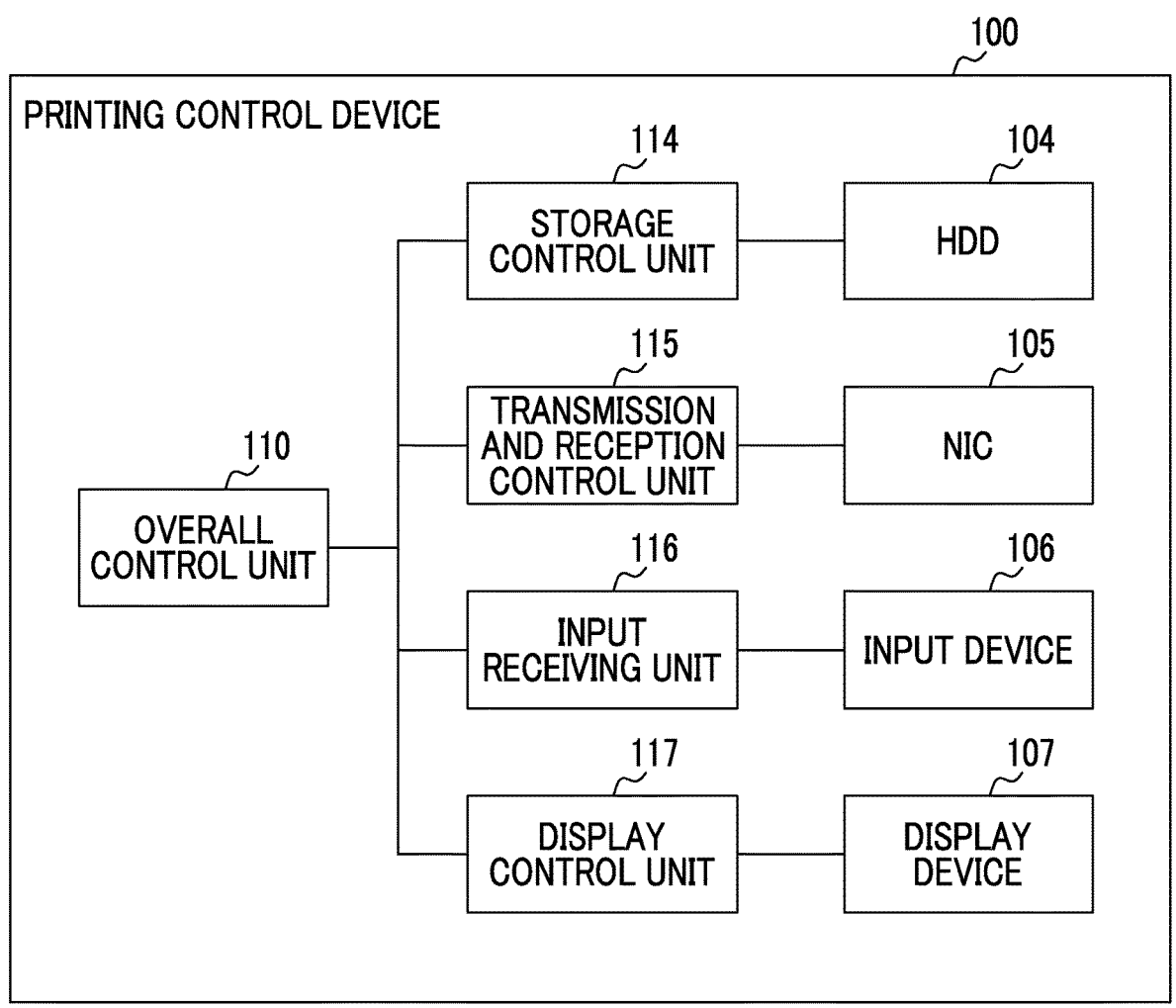
FIG. 5 is a diagram illustrating a functional configuration of the printing control device.

FIG. 5 is a diagram illustrating a functional configuration of the printing control device 100.

The printing control device 100 of the present exemplary embodiment is provided with an overall control unit 110 controlling the overall operation of the printing control device 100.

In addition, the printing control device 100 is provided with a storage control unit 114 controlling the operation of the HDD 104 under the control of the overall control unit 110, a transmission and reception control unit 115 controlling the operation of the NIC 105, an input receiving unit 116 receiving an input from the input device 106, and a display control unit 117 controlling the operation of the display device 107.

Here, in the present exemplary embodiment, the HDD 104 functions as an example of a storage unit and the display device 107 functions as an example of a display unit.

In addition, in the present exemplary embodiment, the overall control unit 110 functions as an example of a creation unit, the storage control unit 114 functions as an example of an acquisition unit, the input receiving unit 116 functions as an example of a receiving unit, and the display control unit 117 functions as an example of an output unit.

Basic Operation of Print System

A basic operation of the print system illustrated in FIG. 1, more specifically, a printing operation (image forming operation) for a product image desired by an operator (user) will be described here.

Once the printing control device 100 outputs a product image printing instruction, each unit constituting the printing device 1 operates as follows in accordance with the printing instruction in the printing device 1.

First, in the delivery unit 10, the delivery roll 11 is rotated in the arrow direction in the drawing (counterclockwise). As a result, the continuous paper P wound around the delivery roll 11 is delivered toward the input side buffer unit 20 at a transport speed Vc.

In addition, in the input side buffer unit 20, the continuous paper P received from the delivery unit 10 is delivered toward the image forming unit 30 at the transport speed Vc by each of the input side first pass roll 21, the input side dancer roll 22, and the input side second pass roll 23 being rotated.

In the image forming unit 30, the continuous paper P received from the input side buffer unit 20 is delivered toward the cooling unit 40 at the transport speed Vc by each of the first transport roll 34, the second transport roll 35, the drying drum 32, the third transport roll 36, and the fourth transport roll 37 being rotated.

In the image forming unit 30, the discharge head group 31 discharges ink of each color based on product image data (details will be described later) with respect to the continuous paper P passing through an image writing position W, and then an image (product image) is formed on one surface (surface) of the continuous paper P.

In addition, in the image forming unit 30, the drying drum 32 and the hot air blower 33 heat the continuous paper P on which the product image is formed in at least a partial region as a result of the passage through the image writing position W. As a result, the continuous paper P and the ink constituting the product image formed on the continuous paper P are dried.

At this time, the drying drum 32 comes into contact with the other surface (back surface) of the continuous paper P on which the product image is not formed and heats the continuous paper P from the back surface side.

The hot air blower 33 faces, without contact, the one surface (surface) of the continuous paper P on which the product image is formed and heats the continuous paper P from the surface side.

In the cooling unit 40, the product image-formed and dried continuous paper P received from the image forming unit (hereinafter, referred to as "post-printing continuous paper P") is delivered toward the image reading unit 50 at the transport speed Vc by each of the six cooling rolls 41 being rotated.

In addition, in the cooling unit 40, the post-printing continuous paper P is cooled by the six cooling rolls 41 alternately coming into contact with the back surface and the surface of the transported post-printing continuous paper P.

In the image reading unit 50, the cooled continuous paper P received from the cooling unit 40 (hereinafter, referred to as "cooled continuous paper P") is delivered toward the output side buffer unit 60 at the transport speed Vc by each of the upstream side transport roll 52 and the downstream side transport roll 53 being rotated.

In the case of the product image printing operation, the image reading unit 50 may not particularly read the product image formed on the continuous paper P.

In the output side buffer unit 60, the image-read continuous paper P received from the image reading unit 50 (hereinafter, referred to as "read continuous paper P") is delivered toward the winding unit 70 at the transport speed Vc by each of the output side first pass roll 61, the output side dancer roll 62, and the output side second pass roll 63 being rotated.

In the winding unit 70, the read continuous paper P received from the output side buffer unit 60 is wound at the transport speed Vc by the winding roll 71 being rotated in the arrow direction in the drawing (counterclockwise).

Meanwhile, in the input side buffer unit 20, the tension applied to the continuous paper P is equalized by the input side dancer roll 22 moving up and down as necessary and the difference in the transport speed Vc of the continuous paper P between the delivery unit 10 and the image forming unit 30 is absorbed.

In addition, in the output side buffer unit 60, the tension applied to the continuous paper P is equalized by the output side dancer roll 62 moving up and down as necessary and the difference in the transport speed Vc of the continuous paper P between the image reading unit 50 and the winding unit 70 is absorbed.

Subsequently, various types of post-processing such as cutting and folding are performed, as necessary and while rewinding is performed, with respect to the continuous paper P wound around the winding roll 71. A final product (printed object) is obtained as a result.

Printing Management Table

With the print system of the present exemplary embodiment, printing can be performed with respect to various types of the continuous paper P.

In addition, with the print system of the present exemplary embodiment, it is possible to set appropriate printing conditions for each of the types of the continuous paper P.

For this reason, in the print system of the present exemplary embodiment, the relationship between the print system and the continuous paper P used in the print system is managed by means of a printing management table.

FIG. 6 is a diagram illustrating an outline of the printing management table stored in the printing control device 100.

The printing management table of the present exemplary embodiment is configured by "paper/printing setting", "name", and "last update date" being associated. Associated in "paper/printing setting" are setting ("paper setting") related to the continuous paper P used for printing and setting ("printing setting") related to the printing device 1 printing an image on the continuous paper P during the image formation (printing) on the continuous paper P performed by the printing device 1. "Name" is given for each "paper/printing setting". "Last update date" is a date on which each "paper/printing setting" is last updated.

In the printing control device 100, various types of setting and the like are performed on the printing management table of the present exemplary embodiment. The printing management table is stored in the HDD 104 provided in the printing control device 100 and is used in the print system.

Each element constituting the printing management table will be described in order below.

Name

"Name" will be described first.

"Name" is freely given by an operator (user) for each "paper/printing setting".

In the case of the printing management table of the present exemplary embodiment, "paper/printing setting" differs, regardless of the same paper setting, that is, using the same type of the continuous paper P, in a case where the printing setting with respect to the continuous paper P differs, and thus a different name is given (see also the relationship between "name": X-1 and "name": X-2 described later).

In addition, "paper/printing setting" differs, regardless of the same printing setting, in a case where the paper setting differs, that is, the continuous paper P of a different type is used, and thus a different name is given.

Paper/Printing Setting

"Paper/printing setting" will be described next.

Paper Setting

"Paper setting" in "paper/printing setting" will be described first.

Present in the setting items of "paper setting" illustrated in FIG. 6 are "size", "basis weight", "type", "pre-print", "coat", and "punch hole".

"Size" means the length of the continuous paper P in the main scanning direction FS, that is, the width (mm) of the continuous paper P.

"Basis weight" means the weight per unit area (g/m2) of the continuous paper P.

"Type" means the type of paper itself that constitutes the continuous paper P.

Here, specific examples of "type" include "plain paper", "recycled paper", and "tack paper".

"Pre-print" means whether or not the continuous paper P has been printed in a separate process in advance.

Accordingly, "none" and "present" are present in "pre-print".

"Coat" means whether or not the continuous paper P has been subjected to a coating treatment in which a paint is applied in advance.

Accordingly, "none" and "present" are present in "coat".

"Punch hole" means whether or not the continuous paper P has been subjected to punching in advance.

Here, specific examples of "punch hole" include "none", "2 holes", "4 holes", and the like.

Printing Setting

"Print setting" in "paper/printing setting" will be described below.

Here, "printing setting" in the present exemplary embodiment includes not only the setting related to the discharge head group 31 provided in the image forming unit 30 but also the setting related to each part constituting each unit of the printing device 1.

Present in the setting items of "printing setting" illustrated in FIG. 6 are "transport setting", "discharge setting", "drying setting" and "cooling setting".

Transport Setting

"First speed" and "second speed" are present in the setting items of "transport setting".

"First speed" means the transport speed Vc (m/s) of the continuous paper P in the image forming operation, which is used in normal and adjustment modes (described later).

"Second speed" means the transport speed Vc (m/s) of the continuous paper P in the image reading operation, which is used in the adjustment mode (described later).

In general, a second speed V2 is set to a value lower than a first speed V1.

Discharge Setting

Present in the setting items of "discharge setting" are "non-discharge nozzle", "gradation correction coefficient", "non-uniformity correction coefficient", and "discharge timing correction coefficient".

"Non-discharge nozzle" is a list of the numbers of the nozzles capable of discharging no ink due to clogging or the like in each of the black head 31K, the yellow head 31Y, the magenta head 31M, and the cyan head 31C that constitute the discharge head group 31.

Accordingly, in "non-discharge nozzle", a head for each color and the number of the non-discharge nozzle in each are stored in an associated state.

The detection of the non-discharge nozzle in the head for each color is performed by the printing device 1 being operated in the adjustment mode (described later).

"Gradation correction coefficient" is used in order to correct the input-output gradation characteristics of the nozzles N1 to Nm, which constitute each of the black head 31K to the cyan head 31C forming the discharge head group 31 provided in the image forming unit 30.

In "gradation correction coefficient", each nozzle constituting the head for each color and the gradation correction coefficient for each nozzle are stored in an associated state.

"Non-uniformity correction coefficient" is used in order to correct the non-uniformity in the main scanning direction FS attributable to the difference in the discharge amounts of the nozzles N1 to Nm, which constitute each of the black head 31K to the cyan head 31C forming the discharge head group 31.

In "non-uniformity correction coefficient", each nozzle constituting the head for each color and the non-uniformity correction coefficient for each nozzle are stored in an associated state.

"Discharge timing correction coefficient" is used in order to correct the difference in the attachment position in the sub scanning direction SS of each of the black head 31K to the cyan head 31C constituting the discharge head group 31.

In "discharge timing correction coefficient", three discharge timing correction coefficients set between the heads for respective colors adjacent in the sub scanning direction SS (black head 31K and yellow head 31Y, yellow head 31Y and magenta head 31M, and magenta head 31M and cyan head 31C) are stored in an associated state.

Drying Setting

Present in the setting items of "drying setting" are "drying drum" and "hot air blower".

"Drying drum" includes an electric power setting value of, for example, a heater (not illustrated) incorporated in the drying drum 32 provided in the image forming unit 30.

"Hot air blower" includes an electric power setting value of, for example, a heater (not illustrated) incorporated in the hot air blower 33 provided in the image forming unit 30.

Cooling Setting

"Cooling roll" is present in the setting item of "cooling setting".

"Cooling roll" includes a setting value such as the amount of refrigerant supply to the six cooling rolls 41 provided in the cooling unit 40.

Others

Although not described in detail here, the other setting items of "printing setting" include, for example, "input side tension setting" related to setting of the tension given to the continuous paper P by the input side buffer unit 20 and "output side tension setting" related to setting of the tension given to the continuous paper P by the output side buffer unit 60.

Last Update Date

"Last update date" will be described below.

"Last update date" means the date and time when any one item of each "paper/printing setting" has been last updated.

Here, in the present exemplary embodiment, once any of the setting items other than "discharge setting" is set or corrected among each "paper/printing setting", processing for reacquiring "discharge setting" is performed based on the post-correction setting.

For this reason, "discharge setting" (non-discharge nozzle, gradation correction coefficient, non-uniformity correction coefficient, and discharge timing correction coefficient) in "paper/printing setting" is always in the state of being acquired on the last update date.

Specific Example of Printing Management Table

Here, in the example illustrated in FIG. 6, the four names of "X-1", "X-2", "Y-1", and "Z-1" are present as the name of "paper/printing setting".

As for the two names of "X-1" and "X-2", the printing setting differs although the paper setting is the same.

The name of "Y-1" differs from the names "X-1" and "X-2" in both the paper setting and the printing setting.

The name of "Z-1" differs from the names "X-1", "X-2", and "Y-1" in both the paper setting and the printing setting.

In this example, "paper/printing setting" of the name "X-1" is last updated on "March 1", "paper/printing setting" of the name "X-2" is last updated on "March 4", "paper/printing setting" of the name "Y-1" is last updated on "February 26", and "paper/printing setting" of the name "Z-1" is last updated on "March 2".

Accordingly, "discharge setting" of the name "X-1" is acquired on "March 1", "discharge setting" of the name "X-2" is acquired on "March 4", "discharge setting" of the name "Y-1" is acquired on "February 26", and "discharge setting" of the name "Z-1" is acquired on "March 2".

Operation of Receiving Printing Instruction by Printing Control Device

Next, the operation of the printing control device 100 in the print system of the present exemplary embodiment will be described.

Figure 7:
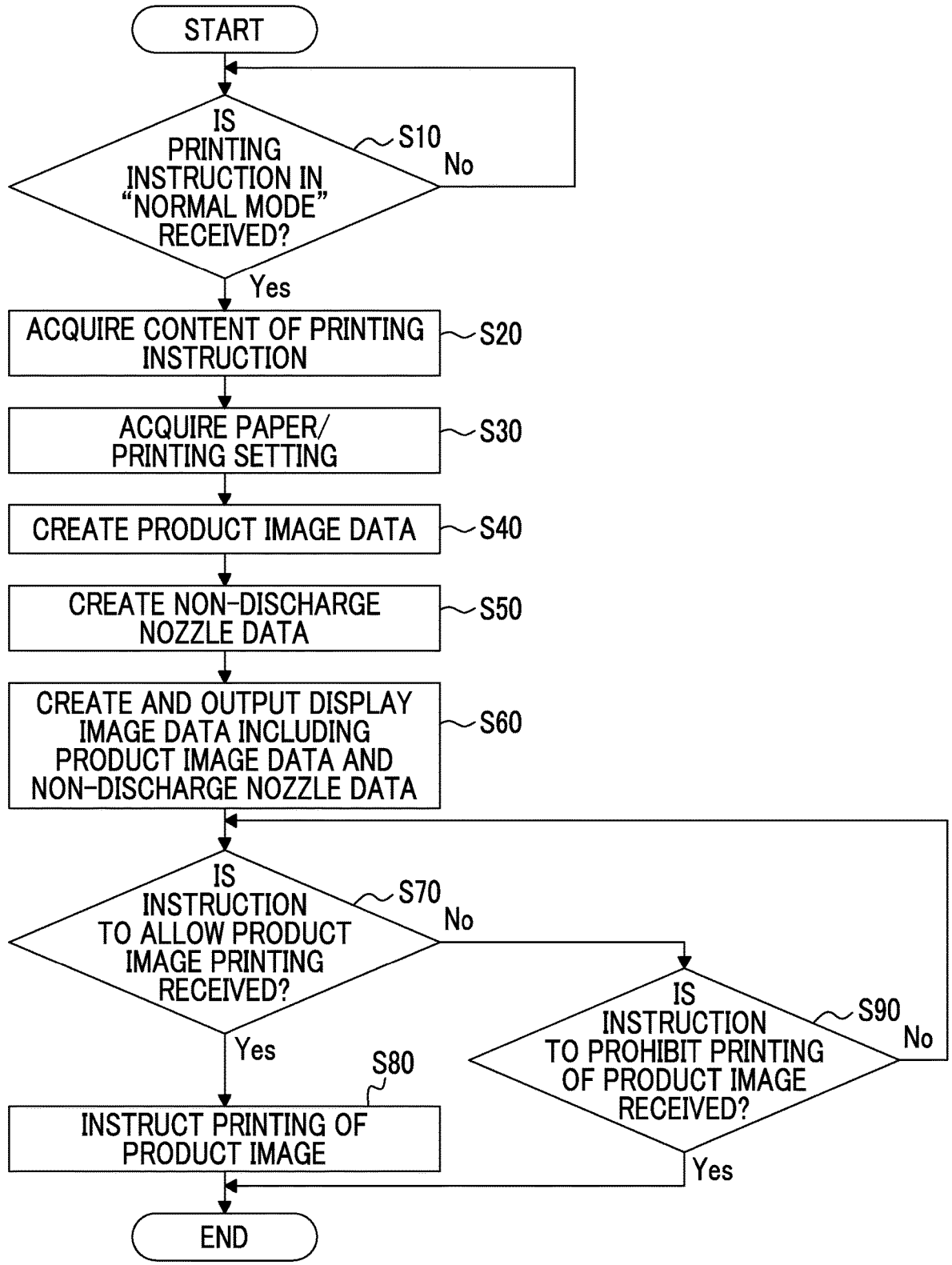
FIG. 7 is a flowchart illustrating an operation of receiving a printing instruction by the printing control device.

FIG. 7 is a flowchart illustrating an operation of receiving a printing instruction by the printing control device 100.

This printing instruction is set in a case where it is desired to print the product image described above.

First, the input receiving unit 116 determines whether or not a printing instruction in "normal mode" has been received from an operator via the input device 106 (step S10).

The processing returns to step S10 and continues in the case of a negative determination (No) in step S10.

The print system of the present exemplary embodiment is capable of operating in "normal mode" and "adjustment mode". This will be described later.

In the case of a positive determination (Yes) in step S10, the transmission and reception control unit 115 acquires the content of the printing instruction from the outside via the NIC 105 (step S20).

This printing instruction includes "original image data", which is the source of a product image to be printed by the printing device 1 in the normal mode.

Next, the overall control unit 110 acquires the paper/printing setting corresponding to the printing instruction from the HDD 104 via the storage control unit 114 based on the content of the printing instruction acquired in step S20 (step S30).

In step S30, the overall control unit 110 refers to the printing management table illustrated in FIG. 6 and reads the paper/printing setting associated with the name based on, for example, "name" included in the printing instruction.

Subsequently, the overall control unit 110 creates "product image data" used for product image printing in the printing device 1 based on the content of the printing instruction acquired in step S20 and the content of the printing instruction acquired in step S30 (step S40).

In addition, the overall control unit 110 reads the content of the setting item "non-discharge nozzle" with the latest last update date from the printing management table stored in the HDD 104 via the storage control unit 114 and, based on the content, creates "non-discharge nozzle data" in the discharge head group 31 (black head 31K to cyan head 31C) provided in the image forming unit 30 of the printing device (step S50).

Then, the overall control unit 110 creates "display image data" including "product image data" created in step S40 and "non-discharge nozzle data" created in step S50 and outputs "display image data" to the display control unit 117 (step S60).

Subsequently, based on "display image data" received from the overall control unit 110, the display control unit 117 causes the display device 107 to display "overlapping image" in which "product image" based on "product image data" and "non-discharge nozzle image" based on "non-discharge nozzle data" are overlapped with each other.

Then, the input receiving unit 116 determines whether or not an instruction to allow product image printing (an example of an instruction to allow output image formation) has been received from the operator via the input device 106 (step S70).

Here, at the point in time when the determination in step S70 is performed, "overlapping image" described above is already displayed on the display device 107 and the operator can determine whether or not to allow the printing of the product image based on the result of visual observation of "overlapping image" displayed on the display device 107.

In the case of a positive determination (Yes) in step S70, the overall control unit 110 instructs the printing device 1 via the NIC 105 to print "product image" based on the content of the printing instruction acquired in step S20 and the content of the printing instruction acquired in step S30 (step S80) and terminates the series of processing.

In the case of a negative determination (No) in step S70, the overall control unit 110 determines whether or not an instruction to prohibit the printing of the product image (an example of an instruction to prohibit the formation of an output image) has been received from the operator via the input device 106 (step S90).

The processing returns to step S70 and continues in the case of a negative determination (No) in step S90.

In the case of a positive determination (Yes) in step S90, the series of processing is terminated as it is without instructing the printing device 1 to print this "product image".

Although not described in detail here, the input receiving unit 116 is capable of receiving an instruction from an operator via the input device 106 to execute inspection (including cleaning, replacement, and the like) of each discharge head constituting the discharge head group 31.

In such a case, printing of the product image may be prohibited.

Then, the discharge head group 31 or the like may be inspected by an operator or a worker (service person).

Normal Mode and Adjustment Mode

Here, "normal mode" and "adjustment mode" in the present exemplary embodiment will be briefly described.

FIG. 8(a) is a diagram illustrating the relationship between various images and various data used in "normal mode" and FIG. 8(b) is a diagram illustrating the relationship between various images and various data used in "adjustment mode".

Hereinafter, "normal mode" and "adjustment mode" will be described in order with reference to the drawings including FIG. 8(a) and FIG. 8(b).

Normal Mode

"Normal mode" is a mode in which "product image" is printed on the continuous paper P by means of the printing device 1 as described above.

As illustrated in FIG. 8(a), in "normal mode", the printing control device 100 creates "product image data Dp" (an example of output image data) based on "printing instruction" from an operator and by using "original image data Do" and "printing setting data Ds" and outputs "product image data Dp" to the printing device 1.

In "normal mode", the printing device 1 prints "product image Ip" based on "product image data Dp" received from the printing control device 100 with respect to the continuous paper P transported along the transport direction T.

Adjustment Mode

In "adjustment mode", "test image" used in order to set and adjust various operation conditions in the printing device 1 is printed on the continuous paper P by means of the printing device 1 (in actuality, "test image" is printed and read).

As illustrated in FIG. 8(b), in "adjustment mode", the printing control device 100 creates "test image data" and outputs "test image data" to the printing device 1.

Here, in "adjustment mode", at least a part of "printing setting data Ds" used in "normal mode" is set, and thus "printing setting data Ds" is not applied to the "test image data Dt".

In "adjustment mode", the printing device 1 prints "test image It" based on "test image data Dt" received from the printing control device 100 with respect to the continuous paper P transported along the transport direction T.

In the print system of the present exemplary embodiment, various types of print setting illustrated in FIG. 6 (including the setting item "non-discharge nozzle") is determined based on the result of the linear image sensor 51 provided in the image reading unit 50 reading the test image It printed on the continuous paper P in this manner.

Original Image Data and Product Image Data

Next, the relationship between the original image data Do and the product image data Dp used in the above-described "normal mode" will be described based on a specific example.

Figure 9A:
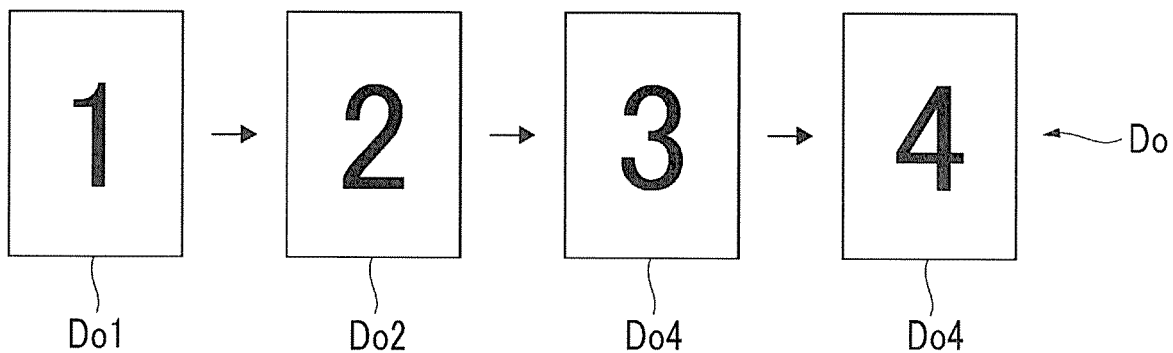
FIGS. 9($a$) to 9($c$) are diagrams illustrating an example of the relationship between original image data and product image data used in the present exemplary embodiment.
Figure 9B:
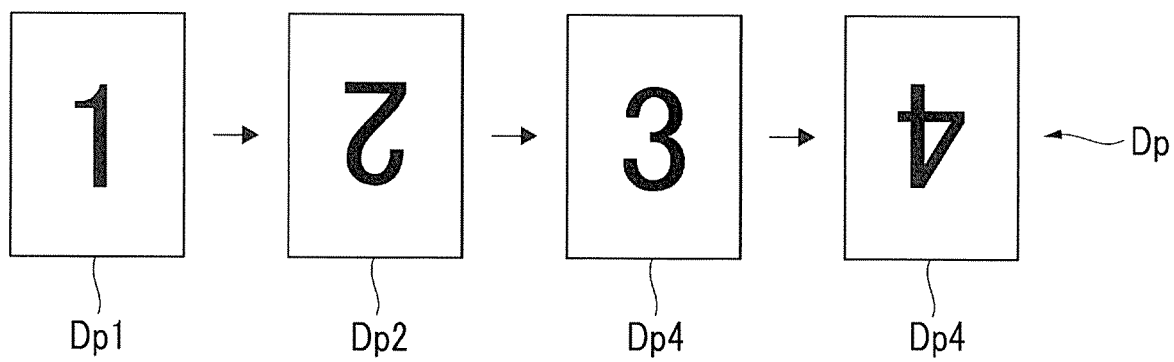
Figure 9C:
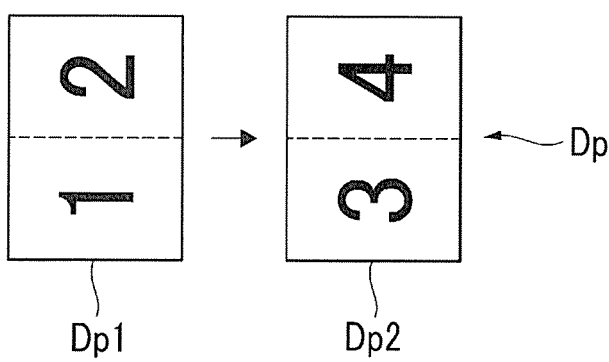

FIG. 9(a), FIG. 9(b) and FIG. 9(c) are diagrams respectively illustrating an example of the relationship between the original image data Do and the product image data Dp used in the present exemplary embodiment.

More specifically, FIG. 9(a) illustrates an example of the original image data Do.

FIG. 9(b) illustrates a first example of the product image data Dp obtained by combination between the original image data Do illustrated in FIG. 9(a) and a first example (not illustrated) of the printing setting data Ds.

FIG. 9(c) illustrates a second example of the product image data Dp obtained by combination between the original image data Do illustrated in FIG. 9(a) and a second example (not illustrated) of the printing setting data Ds.

Example of Original Image Data

First, an example of the original image data Do will be described with reference to FIG. 9(a).

In the example illustrated in FIG. 9(a), four continuous image data constitute the original image data Do.

For convenience, in the following description, the four continuous image data will be referred to as first-page original image data Do1, second-page original image data Do2, third-page original image data Do3, and fourth-page original image data Do4.

In this example, the first-page original image data Do1 includes the image of Arabic numeral "1", the second-page original image data Do2 includes the image of Arabic numeral "2", the third-page original image data Do3 includes the image of Arabic numeral "3", and the fourth-page original image data Do4 includes the image of Arabic numeral "4".

In addition, in this example, it is assumed that the orientation of the number of each of the first-page original image data Do1 to the fourth-page original image data Do4 is vertical (in the top-bottom direction).

First Example of Product Image Data

Next, the first example of the product image data Dp will be described with reference to FIG. 9(b).

In the example illustrated in FIG. 9(b), four continuous image data constitute the product image data Dp as in the case of the original image data Do illustrated in FIG. 9(a).

For convenience, in the following description, the four continuous image data will be referred to as first-page product image data Dp1, second-page product image data Dp2, third-page product image data Dp3, and fourth-age product image data Dp4.

In this example, the first-page product image data Dp1 includes the image of Arabic numeral "1", the second-page product image data Dp2 includes the image of Arabic numeral "2", the third-page product image data Dp3 includes the image of Arabic numeral "3", and the fourth-age product image data Dp4 includes the image of Arabic numeral "4".

In addition, in this example, the respective numbers have a vertical orientation (in the top-bottom direction) in the product image data Dp1 and Dp3 of the odd-numbered pages (first and third pages) and the respective numbers have a vertical orientation (in the direction opposite to the top-bottom direction) in the product image data Dp2 and Dp4 of the even-numbered pages (second and fourth pages).

Accordingly, in the first example of the product image data Dp, the orientation of the image in some of the pages is reversed although the page number is the same as the original image data Do.

Second Example of Product Image Data

The second example of the product image data Dp will be described with reference to FIG. 9(c).

In the example illustrated in FIG. 9(c), two continuous image data constitute the product image data Dp unlike in the case of the original image data Do illustrated in FIG. 9(a).

For convenience, in the following description, the two continuous image data will be referred to as first-page product image data Dp1 and second-page product image data Dp2.

In this example, the first-page product image data Dp1 includes the image of Arabic numerals "1" and "2" and the second-page product image data Dp2 includes the image of Arabic numerals "3" and "4".

In other words, in this example, the first-page product image data Dp1 includes the first two pages of the original image data Do (first- and second-page original image data Do1 and Do2) and the second-page product image data Dp2 includes the last two pages of the original image data Do (third- and fourth-page original image data Do3 and Do4).

In addition, in this example, the orientation of each number is horizontal in the product image data Dp1 and Dp2 of all pages (first and second pages).

Accordingly, in the second example of the product image data Dp, the page number and the orientation of the image in every page differ from the original image data Do (rotated by 90□).

Others

As described above, in the present exemplary embodiment, the obtained product image data Dp differs, even with the same original image data Do, in a case where the content of the printing setting data Ds (related to image disposition) differs.

Although two examples of the product image data Dp obtained from the original image data Do illustrated in FIG. 9(a) are introduced here, the present invention is not limited thereto.

In addition, depending on the content of the printing setting data Ds, the product image data Dp may be the same as the original image data Do.

Product Image Data, Non-Discharge Nozzle Data, and Display Image Data

Figure 10:
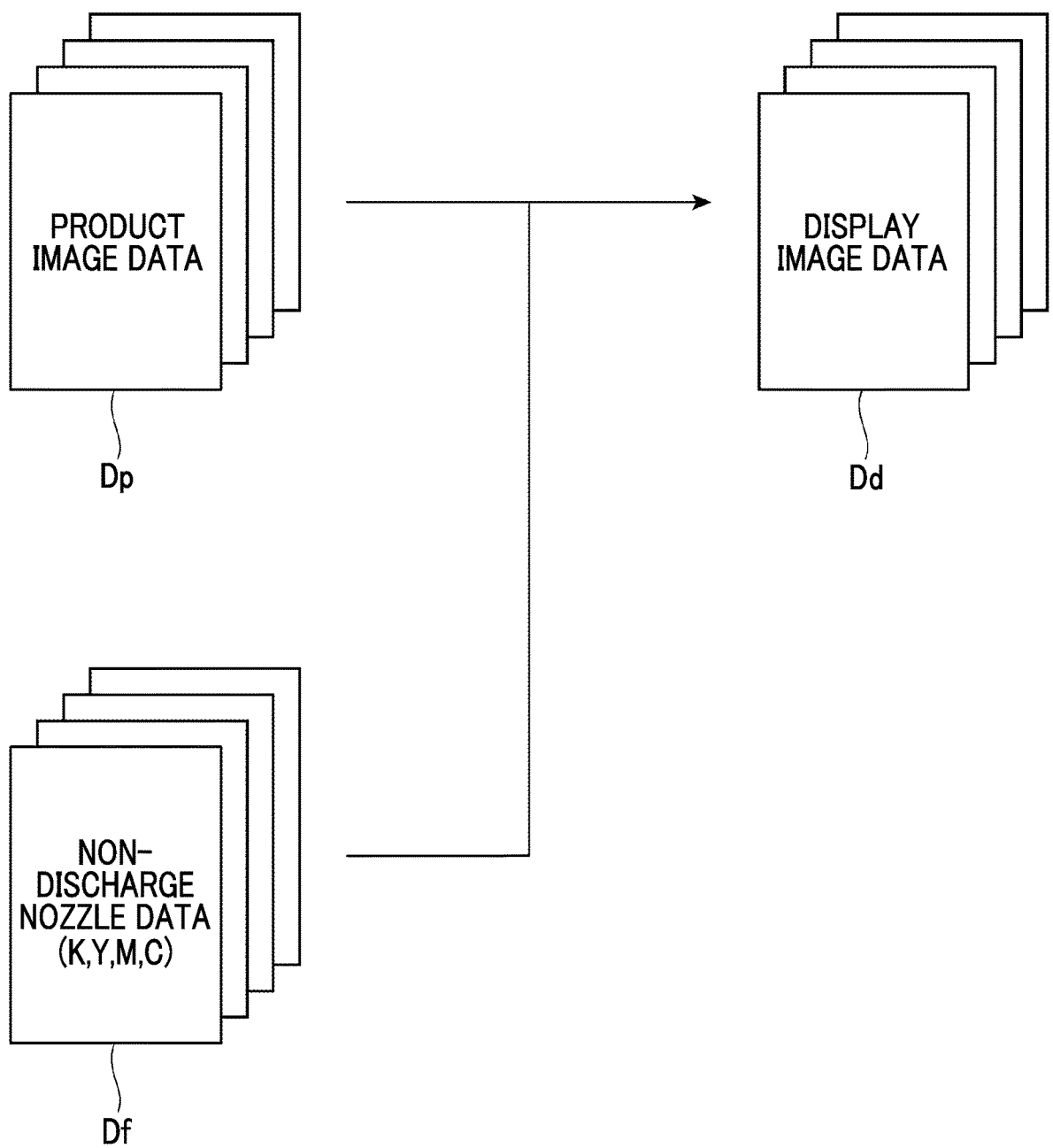
FIG. 10 is a diagram illustrating the relationship between the product image data, non-discharge nozzle data, and display image data used in the present exemplary embodiment.

FIG. 10 is a diagram illustrating the relationship between the product image data Dp, non-discharge nozzle data Df, and display image data Dd used in the present exemplary embodiment.

As described above, in the present exemplary embodiment, the printing control device 100 creates the display image data Dd by using the product image data Dp to be printed by the printing device 1 and the non-discharge nozzle data Df (an example of defect position data) in the discharge head group 31 constituting the image forming unit 30 of the printing device 1.

In the printing control device 100, the overlapping image is displayed on the display device 107 by means of the display image data Dd.

The non-discharge nozzle data Df is obtained based on the setting item "non-discharge nozzle" in the printing management table illustrated in FIG. 6.

Overlapping Image

FIG. 11 is a diagram illustrating an example of an overlapping image Id displayed on the display device 107 based on the display image data Dd created and output in step S60 illustrated in FIG. 7.

The overlapping image Id illustrated in FIG. 11 has the product image Ip based on the product image data Dp constituting the display image data Dd and a non-discharge nozzle image If based on the non-discharge nozzle data Df constituting the same display image data Dd and both are overlapped on the screen.

In this example, the product image Ip has a text image Ipt including various texts, a photographic image Ipp including various photographs, and a graphic image Ipg including, for example, various graphics (also barcodes).

The text image Ipt, the photographic image Ipp, and the graphic image Ipg are set by association between a region (coordinates) on the screen and tag information preset for various images.

In addition, in this example, the non-discharge nozzle image If has a first linear defect image If1 that can result from the a-th nozzle Na becoming non-discharge, a second linear defect image If2 that can result from the b-th nozzle Nb becoming non-discharge, a third linear defect image If3 that can result from the c-th nozzle Nc becoming non-discharge, and a fourth linear defect image If4 that can result from the d-th nozzle Nd becoming non-discharge.

In this example, it is assumed that $a<b<c<d$.

As illustrated in FIG. 11, in this example, the first linear defect image If1 overlaps the text image Ipt constituting the product image Ip, the third linear defect image If3 overlaps the photographic image Ipp constituting the product image Ip, and the fourth linear defect image If4 overlaps the graphic image Ipg constituting the product image Ip.

The second linear defect image If2 is assumed not to overlap any of the text image Ipt, the photographic image Ipp, and the graphic image Ipg constituting the product image Ip.

First Example

First, a case where the a-th nozzle Na as the source of the first linear defect image If1 is present in the black head 31K, the b-th nozzle Nb as the source of the second linear defect image If2 is present in the yellow head 31Y, the c-th nozzle Nc as the source of the third linear defect image If3 is present in the magenta head 31M, and the d-th nozzle Nd as the source of the fourth linear defect image If4 is present in the cyan head 31C will be described as a first example.

In this case, in the overlapping image Id displayed on the display device 107, the first linear defect image If1 may be displayed in black, the second linear defect image If2 may be displayed in yellow, the third linear defect image If3 may be displayed in magenta, and the fourth linear defect image If4 may be displayed in cyan.

In this manner, an operator who visually observes the overlapping image Id displayed on the display device 107 can easily grasp a defect (color loss) corresponding to which color may occur at which position of the product image Ip.

Second Example

Next, a case where all of the a-th nozzle Na to the d-th nozzle Nd as the sources of the first linear defect image If1 to the fourth linear defect image If4 are present in the black head 31K will be described as a second example.

In this case, in the overlapping image Id displayed on the display device 107, all of the first linear defect image If1 to the fourth defect image If4 may be displayed in black.

The line type or the line thickness (or both) during display may differ between the linear defect image overlapping the product image Ip (first, third, and fourth linear defect images If1, If3, and If4 in this example) and the linear defect image not overlapping the product image Ip (second linear defect image If2 in this example).

In addition, the line type or the line thickness (or both) during display may differ, depending on the product image as the object of overlapping (text image Ipt, photographic image Ipp, and graphic image Ipg in this example), also with regard to the linear defect image overlapping the product image Ip (first, third, and fourth linear defect images If1, If3, and If4 in this example).

Although not described in detail here, the first example and the second example described above may be combined.

Others

Although a case where an image is printed on the continuous paper P by a so-called inkjet method has been described as an example in the present exemplary embodiment, the present invention is not limited thereto. For example, the present invention may be applied to a case where an electrophotographic method is used.

Although a case where a so-called full color image is printed on the continuous paper P has been described as an example in the present exemplary embodiment, the present invention is not limited thereto. The present invention may be applied to a case where a monochrome image is printed.

Although a case where an image is printed on one surface (surface) of the continuous paper P has been described as an example in the present exemplary embodiment, the present invention is not limited thereto. The present invention may be applied to a case where images are printed on both surfaces (surface and back surface) of the continuous paper P.

Although a case where an image is printed on the continuous paper P has been described as an example in the present exemplary embodiment, the present invention is not limited thereto. For example, the present invention may be applied to a case where an image is printed on cut paper.

Although the printing control device 100 as an example of an image processing apparatus has the input device 106 and the display device 107 in the present exemplary embodiment, the present invention is not limited thereto. The printing control device 100 may be a device having the CPU 101 and the like without the input device 106 and the display device 107 (such as a main body device of a personal computer).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising a memory and a processor, wherein the memory is configured for storing a program, and the processor is configured to execute the program to
    create output image data to be used in a printer forming an output image on a recording material by using original image data input from an outside,
    acquire a defect image based on defect position data related to a position of a defect to be formed by the printer on the recording material which is attributable to the printer, and
    output display image data to be used for display on a screen of a display by overlapping the defect image on the output image before the output image is formed by the printer on the recording material.

2. The image processing apparatus according to claim 1, wherein the processor creates the output image data by performing processing related to disposition of the output image on the recording material with respect to the original image data.

3. The image processing apparatus according to claim 1, wherein the processor receives an instruction to prohibit formation of the output image after the processor outputs the display image data.

4. The image processing apparatus according to claim 3, wherein the processor further receives an instruction to allow formation of the output image after the processor outputs the display image data.

5. The image processing apparatus according to claim 3, wherein the processor further receives an instruction to prompt inspection of the printer after the processor outputs the display image data.

6. The image processing apparatus according to claim 4, wherein the processor further receives an instruction to prompt inspection of the printer after the processor outputs the display image data.

7. The image processing apparatus according to claim 1, wherein the memory stores a plurality of defect position data different in acquisition time,
    wherein the processor acquires defect position data with a latest acquisition time from the plurality of defect position data stored in the memory.

8. The image processing apparatus according to claim 7, wherein the memory stores the type of the recording material, setting of the printer, and the defect position data attributable to the printer in association.

9. The image processing apparatus according to claim 1, wherein the processor determines a mode for displaying a position of the defect by using disposition of the output image in the output image data and a position of the defect in the defect position data.

10. The image processing apparatus according to claim 9, wherein the processor determines a mode for displaying a position of the defect by using the type of the output image in the output image data and a position of the defect in the defect position data.

11. A print system comprising:
    a printer configured to form an output image on a recording material by using an output image data; and
    an image processing apparatus comprising a memory and a processor, wherein the memory is configured for storing a program, and the processor is configured to execute the program to
    create the output image data by using original image data input from an outside, acquire a defect image based on defect position data related to a position of a defect to be formed by the printer on the recording material which is attributable to the printer, and output display image data to be used for display on a screen of a display by overlapping the defect image on the output image before the output image is formed by the printer on the recording material.

12. A non-transitory computer readable medium storing a program causing a computer to execute the program to
create output image data to be used in a printer forming an output image on a recording material by using original image data input from an outside,
acquire a defect image based on defect position data related to a position of a defect to be formed by the printer on the recording material which is attributable to the printer, and
output display image data to be used for display on a screen of a display by overlapping the defect image on the output image before the output image is formed by the printer on the recording material.

\* \* \* \* \*